United States Patent
Ormond

(10) Patent No.: US 9,870,183 B2
(45) Date of Patent: Jan. 16, 2018

(54) SYSTEM AND METHOD FOR ENERGY EFFICIENT PRINT JOB QUEUING

(71) Applicants: Kabushiki Kaisha Toshiba, Minato-ku (JP); Toshiba TEC Kabushiki Kaisha, Shinagawa-ku (JP)

(72) Inventor: Louis Ormond, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/133,678

(22) Filed: Apr. 20, 2016

(65) Prior Publication Data
US 2017/0308341 A1     Oct. 26, 2017

(51) Int. Cl.
G06F 3/12      (2006.01)
H04N 1/00     (2006.01)

(52) U.S. Cl.
CPC ............ *G06F 3/1267* (2013.01); *G06F 3/126* (2013.01); *G06F 3/1221* (2013.01); *G06F 3/1288* (2013.01); *H04N 1/00896* (2013.01); *H04N 1/00954* (2013.01); *H04N 2201/0094* (2013.01)

(58) Field of Classification Search
CPC ...... G06F 3/1267; G06F 3/1221; G06F 3/126; G06F 3/1288; H04N 1/00896; H04N 1/00954; H04N 2201/0094

USPC ........................................................ 358/1.13
See application file for complete search history.

(56) References Cited

U.S. PATENT DOCUMENTS

| | | | |
|---|---|---|---|
| 2005/0179923 A1* | 8/2005 | Sojian | G06F 3/1204 358/1.13 |
| 2008/0273224 A1* | 11/2008 | Maulsby | G06Q 10/10 358/1.15 |
| 2010/0091318 A1* | 4/2010 | Ferlitsch | G06F 3/1204 358/1.15 |
| 2013/0194611 A1* | 8/2013 | Yamade | G06F 3/1221 358/1.14 |
| 2014/0376024 A1* | 12/2014 | Masuyama | G06F 3/1221 358/1.14 |

* cited by examiner

*Primary Examiner* — Neil R McLean
(74) *Attorney, Agent, or Firm* — Ulmer & Berne LLP

(57) ABSTRACT

A document processing system includes a print job queue management system configured to temporarily hold print jobs in the print queue during periods of light use, so as to maximize the amount of time that the document processing system spends in energy efficient low power modes. The print job queue management system compares print jobs in the queue with print job hold criteria and releases print jobs for printing when certain criteria are met, such as when a threshold number of documents or pages are in the print queue, if an incoming print job is designated as high priority print job to be immediately printed, or during particular times of the day that are designated as peak use times, which can be determined from historical data. A user can manually force a document to print from the user interface of the document processing systems.

17 Claims, 4 Drawing Sheets

SYSTEM AND METHOD FOR ENERGY EFFICIENT PRINT JOB QUEUING

TECHNICAL FIELD

Example embodiments of this application relates generally to setting energy efficient power saving policies on multifunction devices. The application has particular utility in connection with receiving usage data from multifunction devices and sending a customized power saving package to each multifunction devices based on anticipated future usage.

BACKGROUND

Document processing devices are in widespread use in many businesses and academic settings. Such devices include copiers, scanners, printers and facsimile machines. Today, one or more functions associated with such devices are combined in a single unit, referred to as a multifunction peripheral ("MFP") or multifunction device ("MFD"). MFPs are typically network connected to allow users to print remotely from their computers, scan documents that can be sent to a user's computer or a third party's computer (for example via email), copy documents, or fax documents to other people.

Efficient use of energy reduces operating costs. In MFPs, the main use of energy is in heating the toner fuser mechanism to a high enough temperature to melt the toner. The fuser is used to melt toner particles so that the toner adheres to a media substrate such as printer paper. In the normal or awake mode of an MFP, the fuser of the printer is kept warm so that there is little to no waiting period from the time a print job is submitted to when the printer can begin printing.

In order to save energy, MFPs typically are configured to go into energy saving sleep or deep sleep modes if there no activity on the MFP within a threshold, or pre-determined, period of time. In these energy saving modes, the printers turn off the fuser heating element to reduce power consumption.

However, if a new print job is submitted after the MFP enters an energy saving mode, the MFP return to the normal mode, reheat the fuser, and initiate the start of a print cycle. The MFP will then keep the fuser warm for a period of time before reentering an energy saving mode. Similarly, if a new print job is submitted just before the printer enters an energy saving mode, the MFP will initiate the print cycle and then restart the timer for determining whether to enter an energy saving mode. Intermittent printing therefore can prevent the MFP from entering an energy saving mode, or remaining in an energy saving mode, even if the MFP is not printing a substantial portion of the time.

SUMMARY

In accordance with an example embodiment of the subject application, a document processing device includes an embedded controller having a processor, memory, and a network interface. The memory stores data and instructions. The network interface is configured print jobs via a network associated with the document processing device other devices connected to the network. The processor is configured to receive a print job via the network interface, store the print job in a print queue, and compare the print job with print job hold criteria. Based on the comparison, the processor can hold the print job in the print queue for printing at a later time, or release the print job for printing by the document processing device. When the print job is currently being held in the print queue without being immediately printed, the processor can receive a second print job, store the second print job in the print queue, and compare both the print job and the second print job against print job hold criteria. Based on the comparison, the second print job can be held in the print queue without immediately being printed, or the print job and second print job can be released for printing by the document processing device. When the document processing device changes from a power saving operational state to a normal operational state, the processor can be configured to release the print job for printing. For example, if the document processing device awakes from a sleep state due to a timer or any other reason, then the current print jobs in the print queue can be printed by the document processing device. The print job hold criteria can include one or more of the following: a threshold priority setting that when met or exceeded by a priority setting of the print job causes the print job to be immediately released for printing, a threshold number of pages of pending print jobs in the print queue that when met or exceeded causes pending print jobs to be immediately released for printing, a threshold number of print jobs in the print queue that when met or exceeded causes pending print jobs to be immediately released for printing, a threshold number of seconds from the start of the document processing device entering a power save mode of operation that when met or exceeded causes pending print jobs to be immediately released for printing, a first administrator configured time period during which print jobs are immediately released for printing, a second administrator configured time period during which print jobs are held in the print queue without immediately printing, a time period associated with high electrical costs during which print jobs are held in the print queue without immediately printing, and a high usage time period based at least in part on historical usage, during which print jobs are immediately released for printing. For example, a priority setting of a print job can be compared with a threshold priority setting and the print job can be immediately released for printing when the priority setting meets or exceeds the threshold priority setting. The processor can be further configured to poll a second print queue manager of a second document processing system for operational mode information about the second document processing system, for example the current operational mode or a schedule of the future operational mode. Based at least in part on that received operational mode information, the processor transfers the print job to the print queue of the second document processing system and sends a notification of the transfer to the associated user. A user interface on the document processing device can accept an input from a user to immediately release the print job for printing.

In accordance with another example embodiment, a method includes receiving a print job by a document processing device via a network interface, storing the print job in a print queue, and comparing the print job with print job hold criteria. Example print job hold criteria are detailed above. Based on the compare operation, the method can include releasing the print job for immediate printing by the document processing device, or holding the print job in the print queue for printing at a later time. The method can include receiving a second print job while the original print job is still being held in the print queue, storing the second print job in the print queue, and comparing both the original print job and the second print job with print job hold criteria. Based on the compare operation the method can include holding the second print job in the print queue without immediately printing, or releasing both the original print job and the second print job for printing by the document processing device. The method can include releasing the print job for immediately printing when the document processing device changes from a power saving operational state to a normal operational state. The method can include polling a second print queue manager of a second document processing system for operational mode information such as the current operational mode or a schedule of a future operational mode, transferring the print job based at least in part on the operational mode information, and sending notification of the transfer to the user associated with the print job. The method can include accepting an input from a user interface on the document processing device and immediately release the print job for printing based on the received input.

In accordance with another example embodiment, a document processing system can include a network interface configured to receive print jobs, a memory configured to store the print jobs in a print queue, a printer, and a print job queue manager. The printer has a normal operational mode for printing the print jobs, and a power save operational mode. The print job queue manager compares the print jobs in the print queue against one of more print job hold criteria and, based at least in part on the compare operation and the printer currently being in the power save operational mode, the print job queue manager selectively holds the print jobs in the print queue and does not release the print jobs to the printer for printing. The print job queue manager can also compare the print jobs in the print queue each time that a new print job is received. Based on a compare operation subsequent to the initial compare operation that resulted in the print jobs being held in the print queue, the print job queue manager is further configured to release the print jobs held in the print queue to the printer for printing. Releasing the print jobs can cause the printer to switch from the power save operational mode to the normal operational mode. The print job queue manager can poll a second print job queue manager of a second document processing system for operational mode information such as the current operational mode or a schedule of a future operational mode. The print job queue manager can transfer one or more print jobs from the print queue to the print queue of the second document processing system and send notifications to users associated with transferred print jobs. Print job hold criteria that can cause the immediate release of print jobs to the printer for printing can include an administrator configured time period, for example a time of day when an administrator anticipates high usage of the printer, or a high usage time period that is determined based on historical usage of the printer. Print job hold criteria that can cause print jobs to be held in the print queue without printing can include, a threshold priority setting that is not met or exceeded by a priority setting of a print job, a threshold number of print jobs that is not met or exceeded in the print queue, a threshold number of total pages in the print queue that is not met or exceeded, a threshold time from the start of the printer going into the power save operational mode that is not met or exceeded, an administrator configured time period, for example a time of day when an administrator anticipates low usage of the printer, or a low usage time period that is determined based on historical usage of the printer. A user interface can accept a user input that causes the print job queue manager to release the print jobs to the printer, turn the printer from the power save operational mode to the normal operational mode, and cause the printer to begin printing at least one print job from the print queue, for example a print job associated with the user at the user interface of the document processing device.

BRIEF DESCRIPTION OF THE DRAWINGS

Various embodiments will become better understood with regard to the following description, appended claims and accompanying drawings wherein:

DETAILED DESCRIPTION

Figure 1:
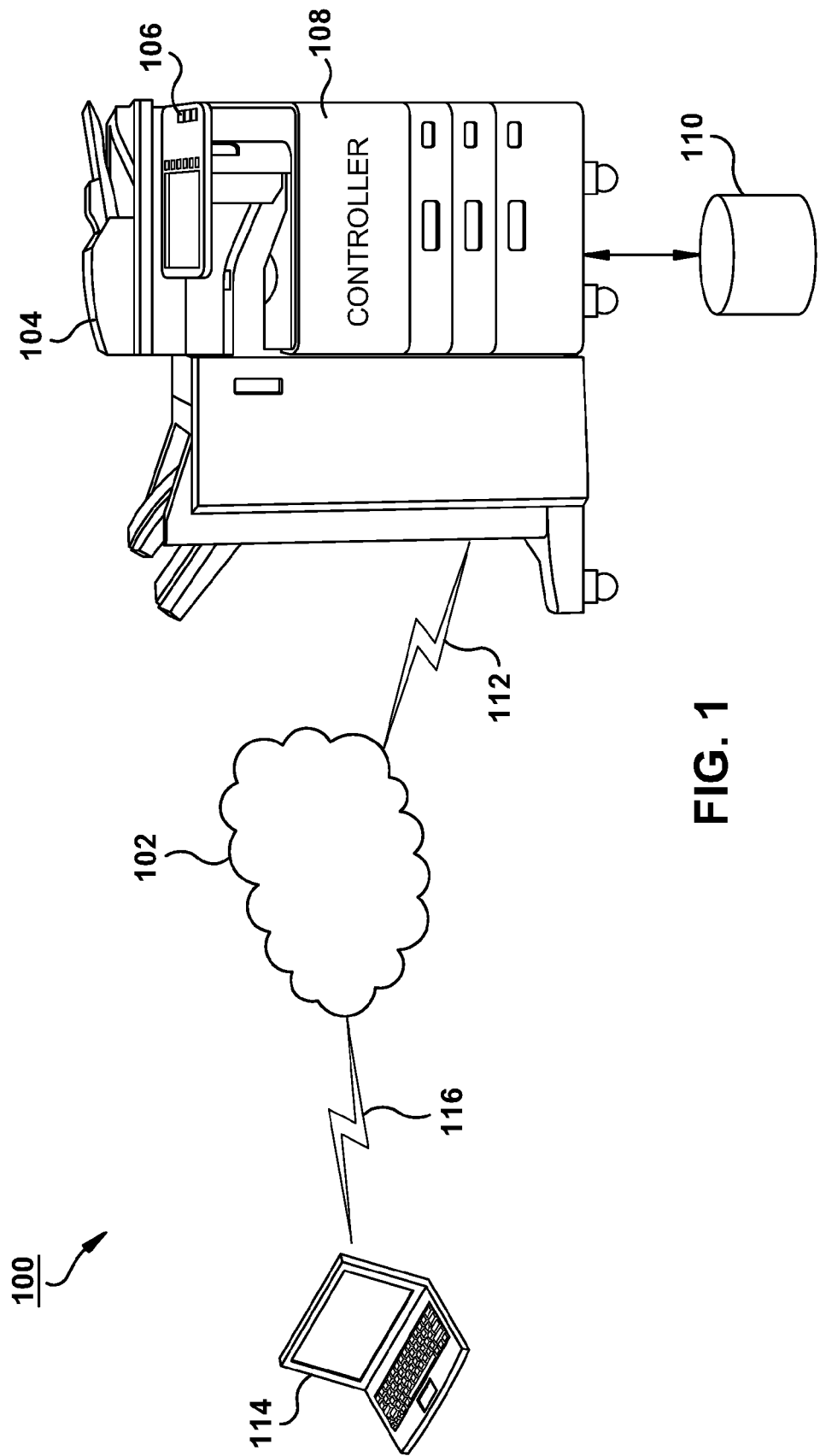
FIG. 1 is an example embodiment of a network with a document processing device.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Document processing devices are employed by users for multiple tasks, including the printing of documents. Suitable document processing devices include scanners, copiers, printers, plotters and fax machines. More recently, two or more of these functions are contained in a single device or unit, referred to as a multifunction peripheral (MFP) or multifunction device (MFD), which may also serve as an e-mail or other information routing gateway. As used herein, MFP includes any device having one or more document processing functions such as those noted above. While example embodiments described herein refer to MFPs, it will be appreciated that they may be also applied to single use devices, such as a printer.

MFPs consume power when in the normal or awake mode. One source of power consumption is the toner fuser element which is heated to a temperature sufficient to melt toner particles and fuse the toner to paper. To reduce the amount of power being consumed by an MFP, the MFP can enter a power saving mode if not in use for a pre-determined period of time. During power saving modes the fuser can be allowed to cool and other electronics can be put into sleep or low power modes.

In a typical operational mode, if a new print job is submitted after the MFP enters an energy saving mode, the MFP return to the normal mode, reheat the fuser, and initiate the start of a print cycle. The MFP will normally keep the fuser warm for a period of time before reentering an energy saving mode. Similarly, if a new print job is submitted just before the printer enters an energy saving mode, the MFP will initiate the print cycle and then restart the timer for determining whether to enter an energy saving mode. Intermittent printing therefore can prevent the MFP from entering an energy saving mode, or cause the MFP to remain in an energy consuming mode, even if the MFP is not printing a substantial portion of the time.

The present disclosure manages the printer device job queue on the MFP so as to optimize the amount of energy usage of the MFP. Using energy efficient print job queueing, the MFP maximizes the amount of time spent in energy saving modes by aggregating print jobs and, when appropriate, printing print jobs in batches. An energy efficient print job queue manager uses historical data, attributes of the print job, and user settings to determine whether to immediately print a print job in the queue or to hold one or more print jobs for a period of time before printing.

The energy efficient print job queue manager can also use electrical costs, for example schedules of electrical costs, to determine when to hold print jobs in the print queue and when to release print jobs to the printer. Information about electrical costs can include hourly schedules of electrical rates that have been negotiated with electrical power providers. For example, during time periods of high electrical costs, print jobs can be queued in the print job and released to the printer during a time period of lower electrical costs. Electrical costs can also be associated with quota allowances from either electrical power providers or based on company goals or ecofriendly company policies. Electrical cost information also can include information about whether locally generated power is available for use. For example, on days where locally generated solar or wind power is not available, print job queue managers can be configured to hold print jobs in print queues for longer periods of time than when locally generated power is available. Conversely, print jobs held in print queues can be released to the printer as locally generated power becomes available.

To do this, the energy efficient print job queue manager calculates a value for each print job received in the print queue. Based on the calculated value, an energy saving timer, user settings, and print job attributes, the energy efficient print job queue manager determines whether to print the print job or hold the print job for a period of time or until another print job is received. If another print job enters the print job queue, the energy efficient print job queue manager will re-evaluate all held print jobs. If the held print jobs meet threshold criteria, the held jobs will be released for printing. A user can also manually override held jobs, for example through an action performed on the front panel user interface of the MFP. Logs of user actions and the energy efficient print job queue manager can be saved and audited.

Turning now to FIG. 1, a document processing system 100 is presented. The document processing system 100 includes a network 102 that is in data communication with one or more document processing devices, suitably comprised of MFP 104 as illustrated. MFP 104 is suitably operable for printing, faxing, scanning, copying, e-mailing, or any other document processing operation will be understood by one of ordinary skill in the art. MFP 104 includes a user interface 106 and is suitably managed by an embedded controller 108 and can include data storage 110 as will be detailed further below. User interaction is suitably provided locally via the user interface 106 or remotely with any suitable computing devices, such as computers, tablets, PDAs, smartphones, or the like.

In the example embodiment of FIG. 1, MFP 104 is coupled for data communication 112 using network 102. Network 102 suitably comprises a local area network (LAN), a remote local area network (RLAN), a wide area network (WAN) which may comprise the Internet, or any combination thereof. A user on a networked computing system 114 can transmit a print job 116 to the MFP 104 over the network 102.

Figure 2:
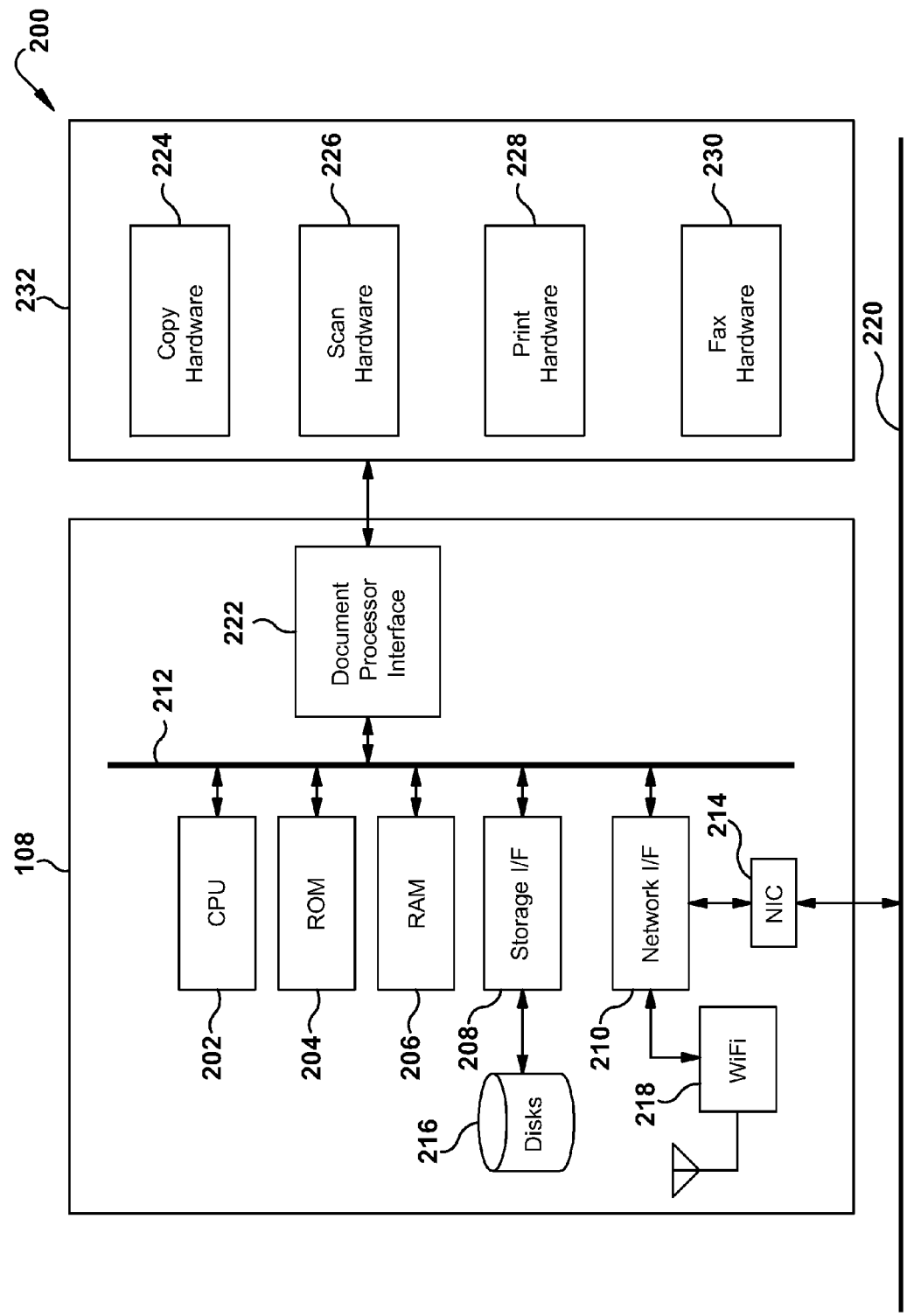
FIG. 2 is a block diagram of an example embodiment of a document processing device.

Turning now to FIG. 2, presented are functional components 200 suitably comprising a document processing device such as MFP 104 of FIG. 1. Included is an example embodiment of controller 108 which is suitably comprised of a computer. Included in example controller 201 are one or more processors, such as illustrated by central processor unit (CPU) 202. Also included are non-volatile memory, such as read-only memory (ROM) 204, random access memory (RAM) 206, a storage interface 208, and a network interface 210. In the example embodiment, CPU 202, ROM 204, RAM 206, storage interface 208, and network interface 210, are in mutual data communication via bus 212. Storage interface 208 facilitates data access with bulk data storage, such as one or more disks 216, or any other suitable data storage such as a flash drive, solid state storage drive, CD, DVD or the like. Network interface 210 suitably provides for external data communication, such as with a network interface connection (NIC) 214 or WiFi interface 218. NIC 214 or WiFi interface 218 suitably provide for connection to an associated network 220. A document processor interface 222 is also in data communication with bus 212, and provides a gateway to copy hardware 224, scan hardware 226, print hardware 228 and fax hardware 230 which together comprise MFP functional hardware 232.

Figure 3:
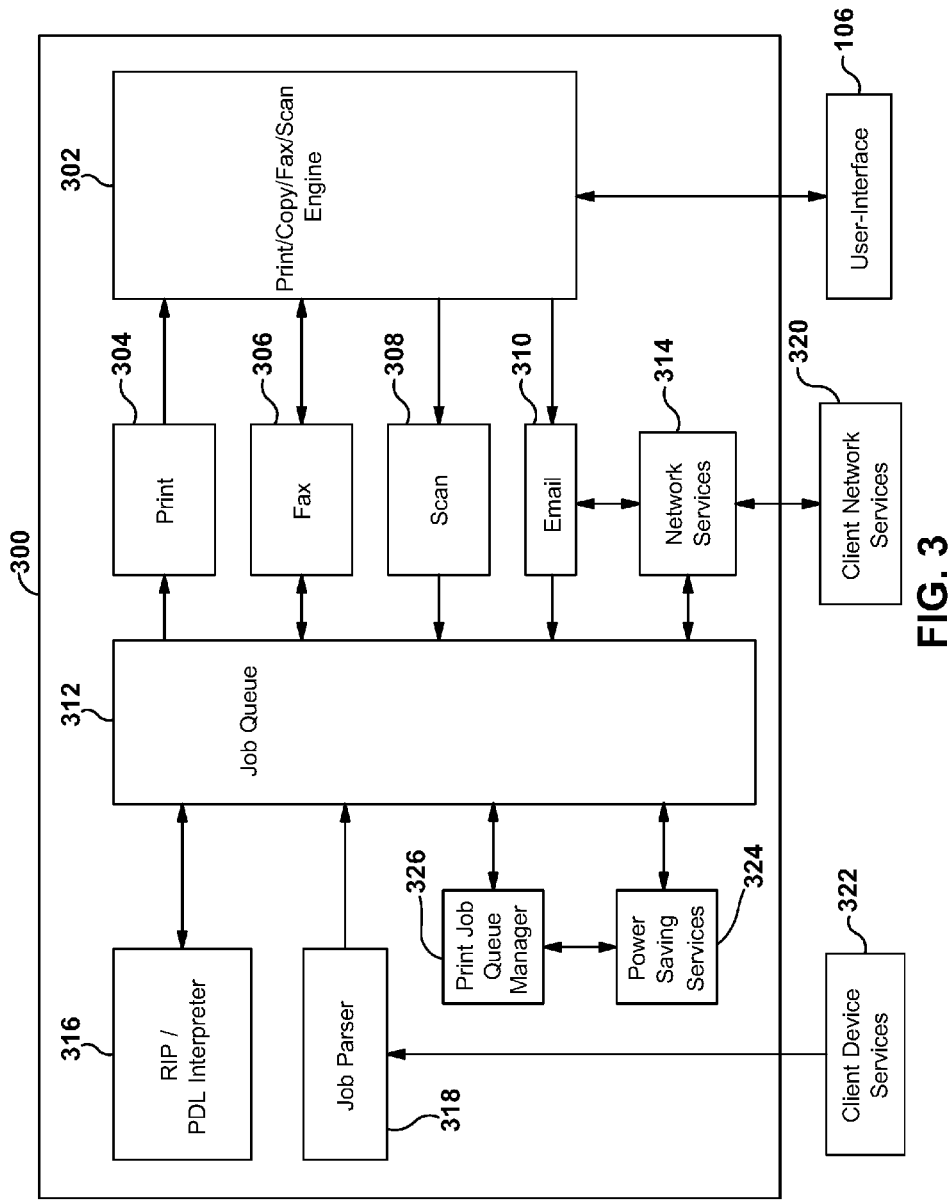
FIG. 3 is a block diagram of an example embodiment of document processing device functionality.

Turning now to FIG. 3, illustrated is a functional block diagram 300 of an example MFP. Included is a print/copy/fax/scan engine 302 which interfaces with print control 304, fax control 306, scan control 308, and email services 310 all of which are suitably interfaced with job queue 312. Email services 310 is suitably interfaced with network services 314. Print/copy/fax/scan engine 302 is suitably provided with user access via user interface 106. Job queue 312 is suitably interfaced with raster image processor (RIP) and page description language (PDL) functionality 316, as well as job parser 318. Job parser 318 is suitably interfaced with client device services 322. Job queue 312 is suitably interfaced with network services 314, which in turn is interfaced with client network services 320. Power saving service 324 is suitably interfaced with job queue 312. Power saving service 324 can place the MFP into a sleep or deep sleep operational mode, or wake the MFP, based at least in part on jobs in the job queue 312 and/or a power saving policy. In embodiments, power saving service 324 can be suitably interfaced with network service 314, user interface 326, print/copy/fax/scan engine 302, and job parser 318. A print job queue manager 326 is suitably interfaced with job queue 312 and power saving service 324. The print job queue manager 326 controls whether incoming print jobs are held in the job queue 312 without immediately being printed, or whether print jobs in the job queue 312 are released for printing as described herein.

Figure 4:
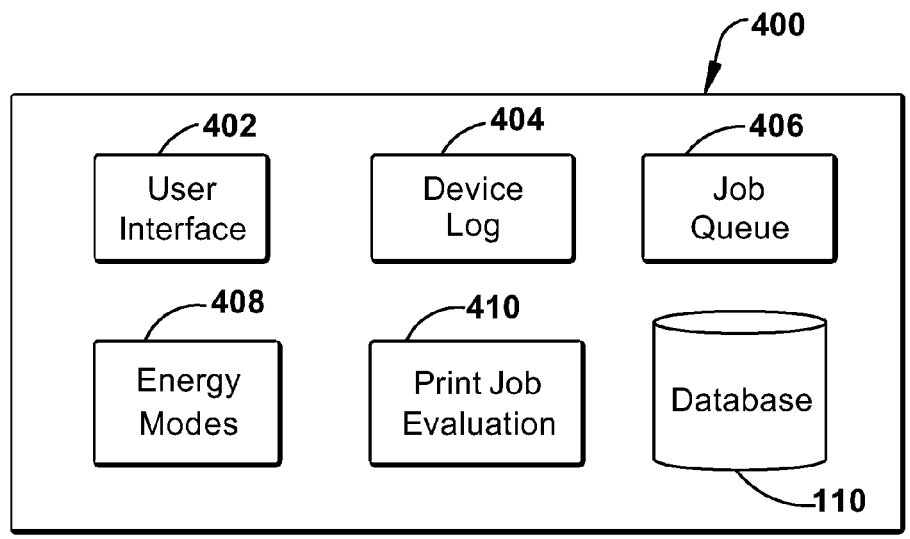
FIG. 4 is a functional block diagram of example modules associated with a print job queue manager.

Turning now to FIG. 4, presented are example software modules of a print job queue manager for MFPs. A UI module 402, or user interface module, allows a system administrator to view and modify the print job hold criteria for determining whether print jobs are to be held in the job queue or immediately printed. A usage collection module 404 or device log collects usage data from one or more MFPs for determining the peak usage times of MFPs. The job queue module 406 can queue and prioritize print jobs for printing by the MFP. An energy mode module 408 can set the operational state of the MFP, for example waking the MFP or keeping the MFP in a normal operational mode during peak usage hours or when print jobs are to be printed, or setting the MFP into a sleep or deep-sleep power saving mode in accordance with a power saving policy. The energy mode module can include a clock as well as a timer for tracking the amount of time that the MFP is in a low energy mode. A print job evaluation module 410 can compare incoming print jobs and print jobs already in the job queue with print job hold criteria and determine whether print jobs are to be temporarily held in the job queue or immediately printed. When the print job evaluation module 410 determines that print jobs are to be temporarily held in the job queue, then the energy mode module 408 keeps the MFP in a low energy operational mode. When the print job evaluation module 410 determines that print jobs are to be printed, then the energy mode module 408 wakes the MFP or keeps the MFP in a normal operational mode, depending on the initial state of the MFP. The print job hold criteria, print jobs, MFP usage data, power saving polices, electrical cost information, and other data can be stored in a suitably configured database 110 or data store.

Figure 5:
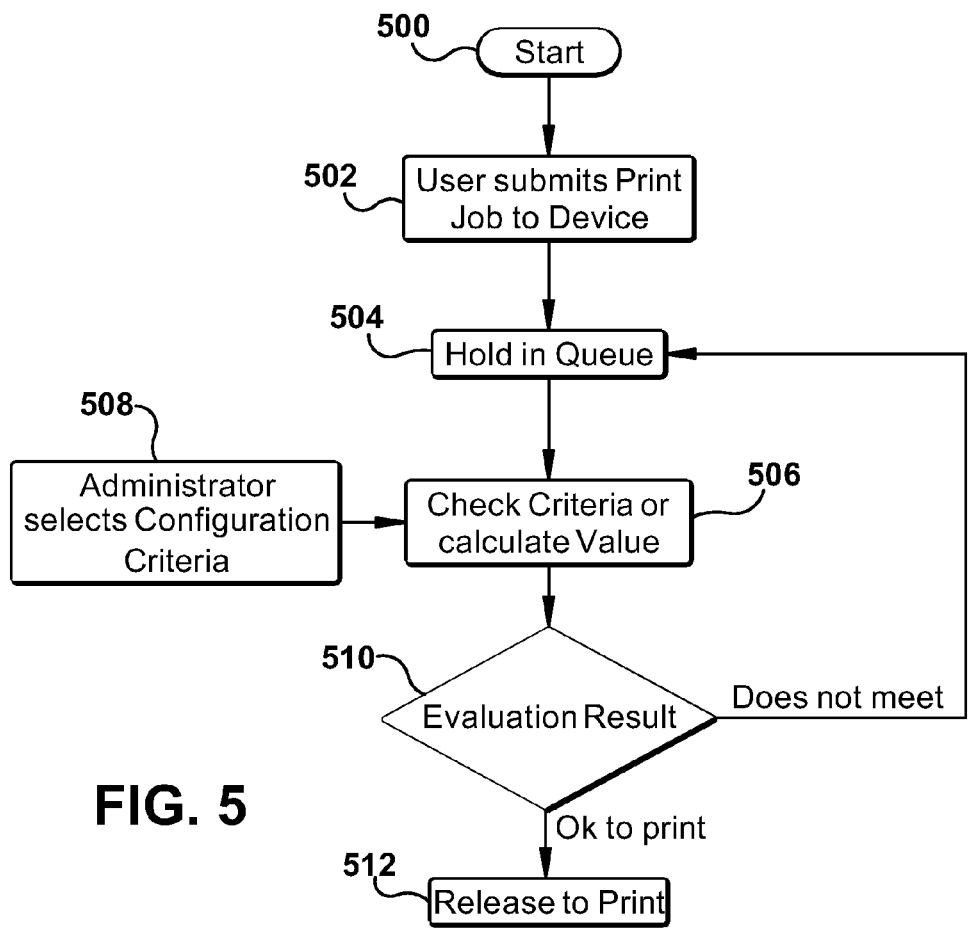
FIG. 5 is a flowchart of example operations of an embodiment of a print job queue manager of a document processing device.

Referring now also to FIG. 5, an example flowchart of operations for energy efficient print job queue management on MFPs is presented. Processing starts at process block 500 labeled "START" and continues to process block 502.

In process block 502, a user submits a print job to an MFP for printing. Processing continues to process block 504.

In process block 504, the print job is placed in the job queue of the MFP. Processing continues to process block 506.

In process block 506, the print job queue manager compares one or more print jobs in the job queue with print job hold criteria. If the MFP is in an awake or normal operational mode, and not in a power save mode, the print job(s) in the job queue can be released for printing. If the MFP is in a power saving mode, the print job queue manager compares the print job(s) in the queue with one or more print job hold criteria to determine whether to release the print job(s) for printing. The print job hold criteria can be received from process block 508 where a system administrator can configure the print job hold criteria. Print job criteria can include, but are not limited to, allowing a print job priority associated with the print job to control whether the print job is released for immediate printing or held in the print queue. Example priorities can include, but are not limited to low, medium, or high priority. If print job priority is permitted and the print job priority is equal to or higher than a threshold print job priority set by the administrator, then the print job is released for printing.

Additional print job hold criteria include releasing the print job(s) for printing when the print queue meets or exceeds a threshold number of print jobs, or pages of print jobs. Still other print job hold criteria include releasing the print job(s) for printing if the document processing device has already been in a power saving mode of operation for a threshold period of time, for example 15 minutes. Print job hold criteria can include administrator configured time periods during which print jobs are automatically released for printing, or automatically held in the queue, which can correspond to time periods that the administrator has determined would be high usage and low usage time periods respectively. Print job hold criteria can be based on current or future electrical costs, energy quotas, and company polices. For example, print jobs and especially bulk print jobs can be deferred until low electrical cost printing is available, such as after-hours or overnight printing. Print job hold criteria can also be based at least in part on historical usage data, for example by determining from usage logs for an MFP a historically high usage time period and releasing documents for printing during those high usage time periods. An additional print job hold criteria can include whether a user has manually requested the MFP to print a print job, for example by inputting a command to print on the user interface of the MFP. In an embodiment, the print job queue manager can poll other nearby MFPs to determine if a different MFP is currently warmed up and in a normal operational mode, or scheduled to return to the normal operational mode sooner than the current MFP. The print job queue manager can selectively transfer a print job from the print queue to the nearby MFP and notify the user of the transferred print job. Once print job(s) have been compared to the print job hold criteria, processing continues to decision block 510.

In decision block 510, if any of the print jobs meet the print job hold criteria for releasing the print jobs, then processing continues to process block 512, otherwise processing continues back to process block 504 to receive additional print jobs in the job queue and evaluable the print job hold criteria against the print jobs in the job queue.

In process block 512, the released print jobs are printed by the MFP. If the MFP was in a power save mode, then the MFP is first placed in an awake or normal operational mode. Processing terminates at end block 514 labeled "END". If additional print jobs are sent to the MFP, then processing begins again at process block 500.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing device, comprising:
   an embedded controller including a processor, a memory in data communication with the processor, and a network interface in communication with the processor, the memory operable for storage of data and instructions, and the network interface configured to receive print jobs via an associated network,
   wherein the processor is configured to
   receive a print job via the network interface,
   store the print job in a print queue,
   compare the print job with print job hold criteria,
   perform, based at least in part on the compare operation, exactly one of releasing the print job for printing by the document processing device, or holding the print job in the print queue without immediately printing,
   poll a second print queue manager of a second document processing system for operational mode information including
   a current operational mode, and
   a schedule of a future operational mode,
   transfer the print job from the print queue to a print queue of the second document processing system based at least in part on the received operational mode information, and
   send notification of the transfer to a user associated with the print job.

2. The document processing device of claim 1, wherein when the print job is held in the print queue, the processor is further configured to receive a second print job via the network interface, store the second print job in the print queue, compare the print job and the second print job against print job hold criteria, and perform, based at least in part on the compare operation, exactly one of releasing the print job and the second print job for printing by the document processing device, or holding the second print job in the print queue without immediately printing.

3. The document processing device of claim 1, wherein when the document processing device changes from a power saving operational state to a normal operational state, the processor is further configured to release the print job for printing by the document processing device.

4. The document processing device of claim 1, wherein the print job hold criteria are selected from one or more of the group consisting of a threshold priority setting that when met or exceeded by a priority setting of the print job causes the print job to be released for printing, a threshold number of pages of pending print jobs in the print queue that when met or exceeded causes pending print jobs to be released for printing, a threshold number of print jobs in the print queue that when met or exceeded causes pending print jobs to be released for printing, a threshold number of seconds from the start of the document processing device entering a power save mode of operation that when met or exceeded causes pending print jobs to be released for printing, a first administrator configured time period, during which print jobs are released for printing, a second administrator configured time period, during which print jobs are held in the print queue without immediately printing, a time period associated with high electrical costs, during which print jobs are held in the print queue without immediately printing, and a high usage time period based at least in part on historical usage, during which print jobs are released for printing.

5. The document processing device of claim 1, wherein the processor is further configured to receive an input from a user interface associated with the document processing device and, in response to the input from the user interface, immediately release the print job for printing by the document processing device.

6. A method, comprising:

receiving a print job by a document processing device via a network interface;

storing, by the document processing device, the print job in a print queue;

comparing the print job with print job hold criteria;

performing, based at least in part on the compare operation, exactly one of releasing the print job for printing by the document processing device, or holding the print job in the print queue without immediately printing;

polling a second print queue manager of a second document processing system for operational mode information including a current operational mode, and a schedule of a future operational mode; and transferring the print job from the print queue to a print queue of the second document processing system based at least in part on the received operational mode information; and sending notification of the transfer to a user associated with the print job.

7. The method of claim 6, further comprising:

receiving a second print job via the network interface when the print job is held in the print queue;

storing the second print job in the print queue;

comparing the print job and the second print job with print job hold criteria;

performing, based at least in part on the compare operation, exactly one of releasing the print job and the second print job for printing by the document processing device, or holding the second print job in the print queue without immediately printing.

8. The method of claim 7, further comprising releasing the print job for printing when the document processing device changes from a power saving operational state to a normal operational state.

9. The method of claim 7, wherein the print job hold criteria are selected from one or more of the group consisting of a threshold priority setting that when met or exceeded by a priority setting of the print job causes the print job to be immediately released for printing, a threshold number of pages of pending print jobs in the print queue that when met or exceeded causes pending print jobs to be immediately released for printing, a threshold number of print jobs in the print queue that when met or exceeded causes pending print jobs to be immediately released for printing, a threshold number of seconds from the start of the document processing device entering a power save mode of operation that when met or exceeded causes pending print jobs to be immediately released for printing, a first administrator configured time period, during which print jobs are immediately released for printing, a second administrator configured time period, during which print jobs are held in the print queue without immediately printing, a time period associated with high electrical costs, during which print jobs are held in the print queue without immediately printing, and a high usage time period based at least in part on historical usage, during which print jobs are immediately released for printing.

10. The method of claim 7, further comprising:

receiving an input from a user interface associated with the document processing device; and releasing the print job for printing by the document processing device in response to receiving the input from the user interface.

11. A document processing system, comprising:

a network interface configured to receive a plurality of print jobs;

a memory configured to store the print jobs received on the network interface in a print queue;

a printer having at least a normal operational mode for printing print jobs and a power save operational mode; and a print job queue manager configured to compare the print jobs in the print queue against one or more print job hold criteria, selectively hold the print jobs in the print queue, without releasing the print jobs to the printer for printing, based on the printer being in the power save operational mode and based at least in part on the compare operation, poll a second print job queue manager of a second document processing system for operational mode information including a current operational mode, and a schedule of a future operational mode; and transfer one or more print jobs from the print queue to a second print queue of the second document processing system based at least in part on the received operational mode information; and sending notification to each user associated with a transferred print job.

12. The document processing system of claim 11, wherein the print job queue manager is configured to compare the print jobs in the print queue each time that a new print job is received by the network interface and stored in the print queue.

13. The document processing system of claim 12, wherein based on a subsequent compare operation the print job queue manager is further configured to release the print jobs held in the print queue for printing by the printer, and wherein releasing the print jobs in the print queue causes the printer to switch from the power save operational mode to the normal operational mode.

14. The document processing system of claim 12, wherein the print job hold criteria include one or more of an administrator configured time period, during which print jobs are immediately released for printing, or a high usage time period based at least in part on historical usage, during which print jobs are immediately released for printing.

15. The document processing system of claim 11, wherein the print job hold criteria are selected from one or more of the group consisting of a threshold priority setting that when not met or exceeded by a priority setting of the print job causes the print jobs to be held in the print queue, a threshold number of pages of print jobs held in the print queue that when not met or exceeded causes the print jobs to be held in the print queue, a threshold number of print jobs in the print queue that when not met or exceeded causes the print jobs to be held in the print queue, a threshold number of seconds from the start of the document processing device entering a power save operational mode that when not met or exceeded causes the print jobs to be held in the print queue, an administrator configured time period, during which the print jobs are held in the print queue without immediately printing, a time period associated with high electrical costs, during which print jobs are held in the print queue without immediately printing, and a low usage time period based at least in part on historical usage, during which the print jobs are held in the print queue without immediately printing.

16. The document processing system of claim 11, further comprising:

a user interface configured to accept a user input, wherein in response to the user input, the a print job queue manager is further configured to release the print jobs to the printer and the printer is further configured to switch from the power save operational mode to the normal operational mode and print at least one print job from the print queue.

17. The document processing system of claim 11, wherein the print job queue manager is further configured to release the print jobs to the printer for printing when the document processing device changes from the power save operational mode to the normal operational mode.

* * * * *